United States Patent [19]

Sexton et al.

[11] Patent Number: 5,058,052

[45] Date of Patent: Oct. 15, 1991

[54] METHOD FOR CHECKING THE SYNTAX OF AN INSTRUCTION LIST PROGRAM TO DETERMINE IF THE PROGRAM IS EXPRESSIBLE AS A RELAY LADDER DIAGRAM BY A PROGRAMMABLE LOGIC CONTROLLER

[75] Inventors: Daniel W. Sexton; Kenneth B. Hall; Alan H. Bailey, all of Charlottesville, Va.

[73] Assignee: GE Fanuc Automation North America, Inc., Charlottesville, Va.

[21] Appl. No.: 422,188

[22] Filed: Oct. 16, 1989

[51] Int. Cl.$^5$ .............................................. G06F 11/00
[52] U.S. Cl. .............................. 364/900; 364/926.93; 364/949; 364/945.7
[58] Field of Search ... 364/200 MS File, 900 MS File, 364/191, 194; 371/19, 63

[56] References Cited

U.S. PATENT DOCUMENTS

| 3,975,622 | 8/1976 | Horn et al. ..................... 364/900 X |
| 4,162,536 | 7/1979 | Morley ................................ 364/900 |
| 4,213,174 | 7/1980 | Morley et al. .................. 364/900 X |
| 4,648,064 | 3/1987 | Morley ................................ 364/900 |
| 4,841,434 | 6/1989 | Mathewes, Jr. et al. ......... 371/19 X |
| 4,853,851 | 8/1989 | Horsch ........................... 364/200 X |

Primary Examiner—Thomas M. Heckler
Attorney, Agent, or Firm—James H. Beusse

[57] ABSTRACT

A method is provided by which a programmable logic controller checks each statement of an instruction list (IL) program to determine if any such statement or the order of statements violates one of a set of syntax rules which are stored in a memory in the controller. If a rule violation is found, an error indication is generated to signify that the particular IL program under test by the controller can not be accurately converted or translated into a relay ladder diagram. However, if no rule violation is found by the controller, then the controller accepts the IL program.

8 Claims, 5 Drawing Sheets

```
LD        %I1
AND       %I2
OR        %I3
OUT       %Q1
<END OF PROGRAM>
```

```
LD      %I1
AND     %I2
OUT     %Q1
OR      %I3
OUT     %Q2
<END OF PROGRAM>
```

METHOD FOR CHECKING THE SYNTAX OF AN INSTRUCTION LIST PROGRAM TO DETERMINE IF THE PROGRAM IS EXPRESSIBLE AS A RELAY LADDER DIAGRAM BY A PROGRAMMABLE LOGIC CONTROLLER

BACKGROUND OF THE INVENTION

This invention relates in general to programmable logic controllers and, more particularly, to a method for determining if the statements of a program utilized by a programmable logic controller are expressible in the form of a relay ladder diagram.

Figures 1, 2A:
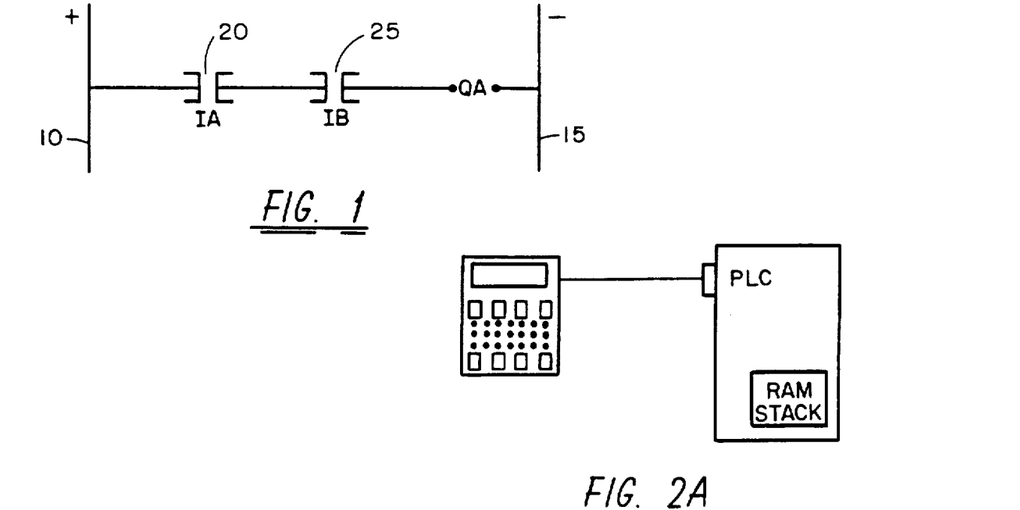
FIG. 1 is a simply relay ladder diagram.
FIGS. 2A-2B are block diagrams of a programmable logic controller system in which the method of the present invention is implemented.

Prior to the time of modern computer technology and programmable logic controllers, logic functions were electromechanically implemented using electric relays, time delay circuits and the like. To aid technicians in wiring such relay logic circuits after they were designed by engineers, these relay logic circuits were represented in the form of what became known an relay ladder diagrams, a brief example of which is shown in FIG. 1. Typically, such relay ladder diagrams include a positive power supply rail 10 and a negative power supply rail 15, each represented by respective vertical lines as in the diagram of FIG. 1. The relay ladder diagram of FIG. 1 includes contacts 20 and 25 which are coupled in series with positive rail 10. Contacts 20 and 25 represent inputs I$a$ and I$b$. The diagram further includes an output 30 which is designated Q$a$. Output Q$a$ may be a motor or meter or other electrically operated device. In essence, the relay ladder diagram of FIG. 1 represents the AND'ing of inputs I$a$ and I$b$, the result of which is provided to output Q$a$. Contacts 20 and 25 are said to form a rung of this relay ladder diagram. Several rungs can be positioned between the vertical rails of this diagram to perform additional AND logic operations thus giving the diagram the general appearance of a ladder. To indicate the performance of OR logic operations, rungs can be connected together and to a common output as will be illustrated later.

Modern programmable logic controllers can be programmed in a language, such as Instruction List (IL) language, which is known to those skilled in the controller art. For the most part, a language such as Instruction List, can be expressed in terms of a relay ladder diagram and be displayed as such for the convenience of technicians who must perform associated logic circuit wiring. Unfortunately, it has been found that not all IL programs can accurately be expressed in terms of relay ladder diagrams. That is, not all IL programs can be translated or converted to relay ladder diagrams for display to the user.

SUMMARY OF THE INVENTION

Accordingly, one object of the present invention is to provide a method for determining when a particular program is not translatable or convertible into a relay ladder diagram.

Another object of the present invention is to provide an method for checking the syntax of IL programs.

Yet another object of the invention is to determine those programs which are displayable and editable as relay ladder diagrams.

In accordance with the present invention, a method is provided for determining if an instruction list program is representable as a relay ladder diagram. The program to be tested is provided to a programmable logic controller including a memory for storing such program. The method includes the step of providing the controller with a predetermined set of rules, the violation of a rule by a statement in the program indicating that the program is not accurately representable as a relay ladder diagram.

The method further includes the step of processing in the controller each statement of the program to determine if any of the statements violate a rule in the set of rules. The method also includes the step of generating in the controller an error indication if any statement of the program violates one of the set of rules. In one embodiment of the invention, the method of the invention also includes the step of terminating in the controller the step of processing, such terminating step being invoked when a statement of the IL program is found to violate the set of rules.

BRIEF DESCRIPTION OF THE DRAWINGS

The features of the invention believed to be novel are specifically set forth in the appended claims. However, the invention itself, both as to its structure and method of operation, may best be understood by referring to the following description taken in conjunction with the accompanying drawings in which:

DETAILED DESCRIPTION OF THE INVENTION

FIG. 2A shows a block diagram of a programmable logic controller system including a programmable logic controller (PLC) 50 coupled to an input device 55 used for generating instruction list programs. The instruction list programming device 55 consists of a keypad 51, a two line LCD display device 52, RAM memory and a CPU. A storage device is available on the instruction list programmer called a Factory Automation (FA)

Figure 2B:
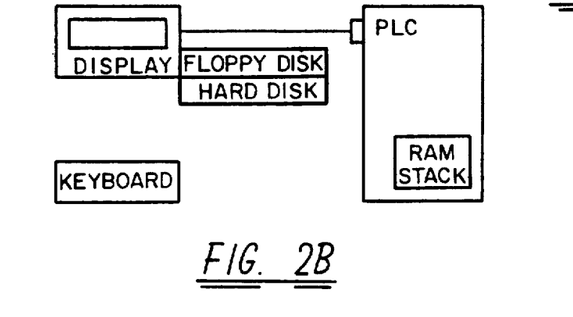

Card which consists of a battery backed RAM. The FA Card is used to input prewritten instruction list programs into the PLC. Alternately, FIG. 2B shows a RLD programming device 53 consisting of an eighty column display 60, hard and floppy disk drives 56, and a full computer keyboard 57. The RLD programming device is graphical in nature and is used to input only RLD programs into the PLC 50. The floppy disk and hard disks can be used to store and load prewritten RLD programs into the PLC. It is desirable that all programs generated by the instruction list programming device 55 be compatible with the RLD programming device 53. Display 60 is used to display a relay ladder diagram equivalent of an instruction list program when it is determined that conversion of the instruction list program into a relay ladder diagram is possible. That is, when programmable logic controller 50 determines that such conversion is possible, the RLD program performs the conversion from IL to RLD.

Figure 3A:
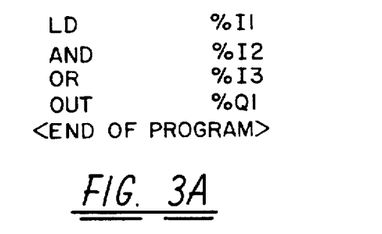
FIG. 3A is an example of an instruction list program which is convertible to relay ladder diagram format.

FIG. 3A illustrates one form of an instruction list program which is convertible and displayable as a relay ladder diagram. To facilitate understanding of instruction list programs and corresponding relay ladder diagrams, the meaning of the statements of the IL program of FIG. 3A is now briefly discussed in sequence. The LD % I1 statement at the beginning of the IL program of FIG. 3A pushes the contents of the accumulator onto the stack and loads the contents of input % I1 into the accumulator. Those skilled in the art will appreciate that programmable logic controllers such as controller 50 include an accumulator in the central processing unit memory of the controller and further include a stack which is a portion of the CPU memory (RAM) 56. For this reason, these terms are not discussed further. The AND % I2 statement logically AND's the contents of the accumulator with the contents of input % I2 and places the result in the accumulator. The LD % I3 statement pushes the contents of the accumulator onto the stack and loads the contents of input % I3 into the accumulator. The OR BLK statement performs a logical OR operation on the top of the stack with the contents of the accumulator and then pops the accumulator. The OUT % Q1 statement then loads an output location designated % Q1 with the contents of the accumulator. The <END OF PROGRAM> statement is a statement which ends the execution of the program.

Figure 3B:
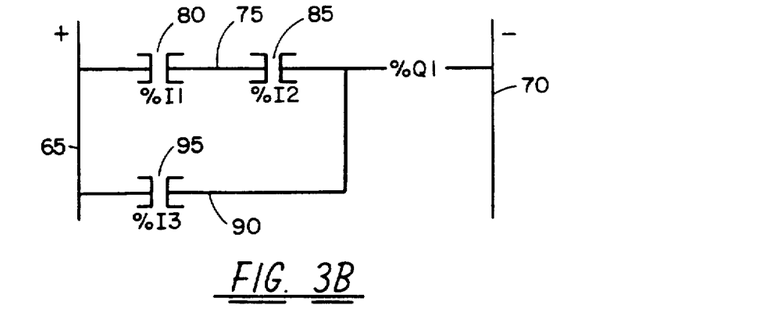
FIG. 3B is a relay ladder diagram version of the instruction list program of FIG. 3A.

The IL program of FIG. 3A is an example of one IL program which can be successfully converted to and be represented as a relay ladder diagram. To illustrate this point, FIG. 3B shows a relay ladder diagram equivalent of the IL program of FIG. 3A. The relay ladder diagram of FIG. 3B includes a positive power rail 65 and a negative power rail 70. A rung 75 extends between rail 65 and output point % Q1. Relay contacts 80 and 85 are shown in rung 75 as being connected in series between rail 65 and output % Q1. Rung 75 represents the logical AND'ing of input % I1 and input % I2 and the providing of the resultant output to output % Q1. The relay ladder diagram of FIG. 3B includes another set of contacts 95 which are coupled in series with rail 65 and output % Q1. Contacts 95 represent the logical OR'ing of input % I3 with the resultant of the logical AND'ing of inputs % I1 and % I2.

Figure 4A:
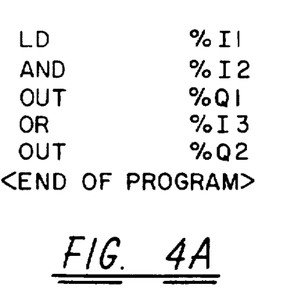
FIG. 4A is an example of an instruction list program which is not convertible to relay ladder diagram format.

FIG. 4A is an example of an instruction list program which is not convertible to and displayable as a relay ladder diagram. The LD % I1 statement at the beginning of the IL program of FIG. 4A pushes the contents of the accumulator onto the stack and loads the contents of input % I1 in the accumulator. The AND % I2 statement logically AND's the contents of the accumulator with the contents of input % I2 and places the result in the accumulator. The OUT % Q1 statement loads the output location % Q1 with the contents of the accumulator. The OR % I3 statement logically OR's the contents of output location % Q1 with % I3. The OUT % Q2 statement then provides the result of that OR'ing operation to output location % Q2. The <END OF PROGRAM> statement ends the execution of the program.

Figure 4B:
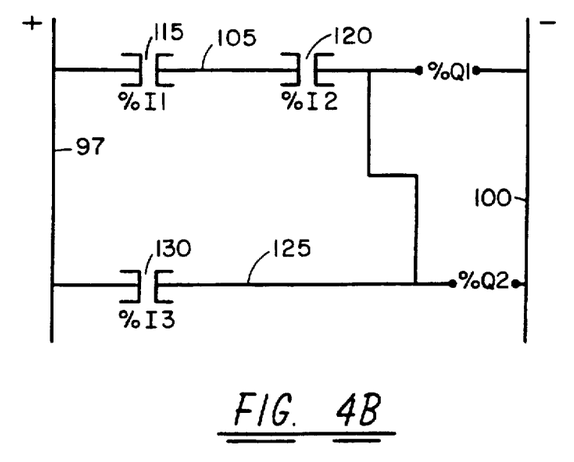
FIG. 4B is a relay ladder diagram version of the instruction list program of FIG. 4A.

Unfortunately, the IL program of FIG. 4A can not be truly accurately represented in a conventional relay ladder diagram. An approximation of what an attempted relay ladder diagram for the IL program of FIG. 4A might appear like is shown in FIG. 4B. The relay ladder diagram of FIG. 4B includes a positive rail 97 and a negative rail 100. This diagram includes a rung 105 including series connected relay contacts 115 and 120 situated between rail 97 and output % Q1. Contacts 115 and 120 connected in this manner represent the first three statements of the IL program of FIG. 4A, namely the loading of % I1, the AND'ing of % I1 with % I2, and the providing of the resultant output to output % Q1. An attempt has been made in FIG. 4B to represent the remaining OR % I3 and OUT % Q2 statements as a rung 125 extending between rail 97 and an output % Q2. Rung 125 includes relay contacts 130 which represent % I3. In an attempt to express the above OR'ing operation, contacts 130 are shown coupled to output % Q1. Unfortunately, if relay contacts were to actually be wired in this manner, output % Q1 would always be coupled to output % Q2. This would only be valid if it were understood by the user that power is not permitted to flow backwards, that is, from output % Q2 to output % Q1. Such a unidirectional current flow designation is not within the scope of conventional relay ladder diagrams. Thus, the attempt to convert the IL program of FIG. 4A to a relay ladder diagram fails.

In accordance with the present invention, a method is provided for checking each of the statements of an IL program to determine if such statements are suitable for conversion to a relay ladder diagram. To perform such a determination, programmable logic controller 50 checks each statement of the IL program for compliance with each of the rules set forth in the following set of rules in Table 1. These rules have been developed only for the implementation of one form of PLC based upon the architecture of that PLC. Other implementations and/or architectures may create different sets of rules.

TABLE 1

1) The solution stack depth prior to executing the first instruction in the IL program sequence is zero; The execution of this first IL program instruction increases the stack depth to 1.
2) The solution stack depth prior to executing the last instruction of the IL program sequence is 1. The execution of this last IL program instruction decreases the stack to zero.
3) The OUT+ and OUT− instructions destroy the solution stack. As a result, these instruction are IL program sequence terminators.
4) Any coil instruction (other than OUT+ and OUT−) followed by a load instruction, a CEND, a NOOP or an END function with a stack depth of 1 is an IL program instruction sequence terminator.

5) The AND BLK, OR BLK and OUT BLK instructions all pop the stack, but none of these instructions are an instruction sequence terminator.

6) The CEND, NOOP and END functions are single instruction sequences (both start and terminate an instruction sequence); all other instruction sequences must begin with a load instruction.

7) A function with one or more Boolean inputs cannot be the first instruction in a sequence.

8) If the Boolean output of a function in connected to other logic, it can only be connected to the Boolean input of another function or a coil; no other instruction can follow a function.

9) Logic may not branch around a function (functions destroy the solution stack).

10) Parallel branches must be properly nested. That is, there can be no branches either into or out of another branch.

11) The number of PUSHES and POPS in the IL program should be equal.

12) The stack depth shall not exceed a predetermined number of statements that cause stack to be pushed, for example 7.

To actually perform the above discussed checking of each of the statements of a particular IL program for convertibility to relay ladder diagram format, programmable logic controller 50 is programmed with a statement processor program which enforces the rules of Table 1. That is, the statement processor program is inputted to controller 50 via input device 55 or floppy disk drive 57 and is loaded into memory 56. For convenience, the statement processor may be permanently stored on hard disk drive 58. For sake of completeness, the complete code for the statement processor is provide in Appendix 1. The INSTRUCTION GROUPS used in the statement processor are presented below in Table 2.

TABLE 2

| INSTRUCTION GROUPS | | |
| --- | --- | --- |
| fblk_0 | :: | [NOOP  ENDSW  CEND] |
| fblk_1x | :: | [MCR  JUMP] |
| fblk_1 | :: | [TMR  ADD  DPADD  SUB  DBSUB  MUL  DIV  MOD  EQ  NE  GT  GE  LT  LE  AND  OR  NOT  MOVEI  MOVIN  BMOVI MOVEW  MOVWN  BMOVW  BLKCL  COMRQ  INT  BCD  DOI/O  ROL  ROR  DPMUL  DPDIV  DPMOD  DPEQ  DPNE  DPGT  DPGE  DPLT  DPLE  SYSRQ] |
| fblk_2 | :: | [ONDTR  UPCTR  DNCTR  SHL  SHR  SHFRI  SHFRW] |
| fblk_3 | :: | [SEQB] |
| load | :: | [LD  LD NOT] |
| and | :: | [AND  AND NOT] |
| and_or | :: | [AND  AND NOT  OR  OR NOT] |
| out | :: | [OUT  OUTM  OUT NOT  OUTM NOT  SET  SETM  RST  RSTM] |
| out_tr | :: | [OUT+  OUT−] |
| ld_bl | :: | [LD BLK] |
| out-bl | :: | [OUT BLK] |
| a_o_bl | :: | [AND BLK  OR BLK] |
| nop | :: | [NOP] |
| eop | :: | [<END OF PROGRAM>] |

The NEEDED VARIABLES used in the statement processor are presented below in Table 3.

TABLE 3

| NEEDED VARIABLES | | |
| --- | --- | --- |
| state check*/ | :: | [0..8] VALUE 0/*9; state validity |
| max_dp stack | :: | [7 /*30,35*/]; Maximum depth of |
| stk_dp stack*/; stack depth | :: | [1..max_dp] /* Monitor depth of |
| par_br sequence indicator*/ | :: | [FALSE  TRUE] /*Multi-branch |
| stk_cn /*Stack element from LD BLK*/; stack counter | :: | ARRAY [stk_dp] OF [TRUE  FALSE] |

Although the complete statement processor code has been shown in Appendix 1, to further understanding of the invention, a state diagram flow chart of the statement processor program is shown in FIGS. 5A–5I which are now discussed in detail.

It is assumed that the statement processor program in programmable logic controller 50 begins processing statements at the first statement of the particular IL program under test. Thus, this first statement of the IL program under test by controller 50 is initially considered to be the subject statement on which the statement processor operates according to the set of rules set forth in Table 1. It is also assumed that when processing the first statement of the IL program, the statement processor starts at State 0 which is seen at the center of the state diagram of FIG. 5A. The terms statement and instruction are used interchangeably herein. After testing of the first statement of the IL program is completed by the statement processor in controller 50, then the next statement in the IL program becomes the subject statement which is subjected to test by the statement processor.

Figure 5A:
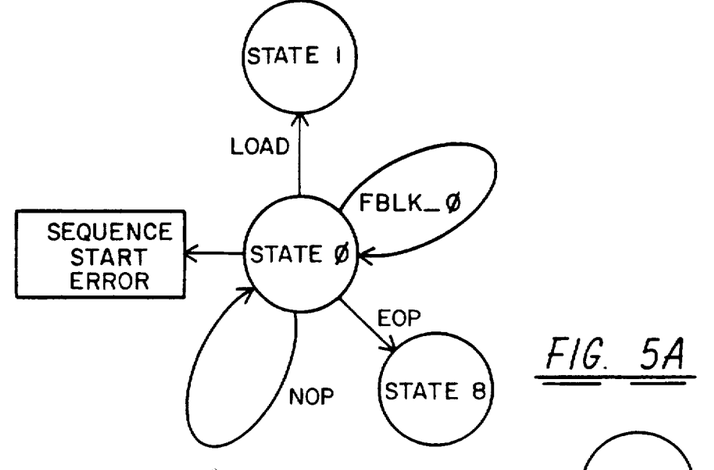
FIG. 5A is a state diagram of State 0 of the statement processor program employed in the programmable logic controller to test an IL program for convertibility to relay ladder diagram format.

Starting in State 0 of FIG. 5A, it is seen that if the subject statement of the IL program is a member of the fblk_0 instruction group of Table 2 (that is, a NOOP, ENDSW or CEND statement as seen in the fblk_0 group of Table 2), then flow returns back to State 0. However, if the subject statement is a member of the load instruction group (LD, LD NOT), then flow continues to State 1. If the subject statement is a member of the eop instruction group (<END OF PROGRAM>), then flow goes to State 8 whereas if the subject statement is a member of the nop instruction group (NOP), then flow continues back to State 0. However, if the subject statement is determined to be a member of none of the above instruction groups of State 0 (that is, neither fblk_0, load, eop nor nop instruction groups), then as indicated by the ELSE flow line in FIG. 5A, a "sequence start error" is issued. This error signifies that the subject statement can not be accurately represented in a relay ladder diagram. Hence if this error or another error occurs during a particular IL program under test by the statement processor in controller 50, this indicates that this IL program is one which can not be converted to a relay ladder diagram.

It is noted that each time flow proceeds to another state or loops back to the same state, the statement processor in programmable logic controller 50 proceeds to the next statement in the sequence of instructions in the IL program. This next statement in the IL program then becomes the subject statement. The statement processor in controller 50 then performs the prescribed tests on this subject statement or instruction according to the present state.

Figure 5B:
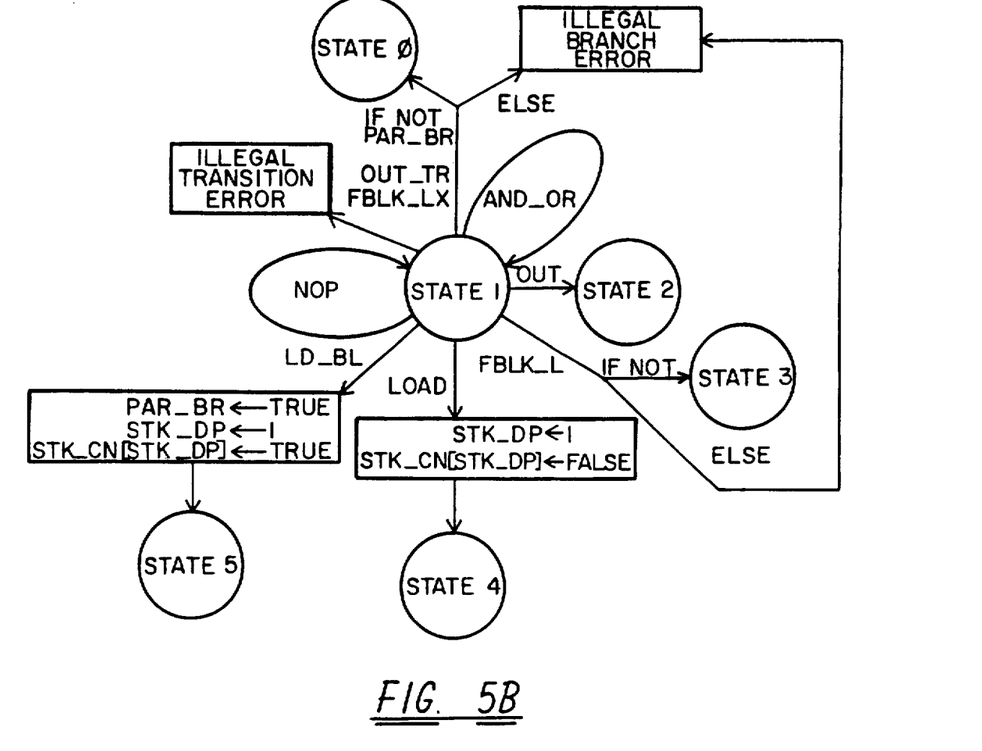
FIG. 5B is a state diagram of State 1 of the statement processor.

FIG. 5B is a state diagram of State 1 of the statement processor. When State 1 is entered, flow proceeds to the center circle of the state diagram of FIG. 5B which is designated State 1. If the subject statement under test is a member of the out_tr instruction group of Table 2 (namely, OUT+ or OUT−) or a member of the fblk_1x instruction group (namely, MCR or JUMP), then a test is conducted to see if par_br (parallel branch) flag is not set. If par_br is not set, then flow proceeds back to State 0 and the next statement in the IL program sequence is tested. Otherwise, an "illegal branch error" is issued as indicated in the state diagram of FIG. 5B. An illegal branch error indicates that the subject statement under test is not convertible to a relay ladder diagram.

If, however, the subject statement is found to be a member of the and_or instruction group (AND, AND NOT, OR, OR NOT) of Table 2, then flow proceeds back to State 1 at which the next statement in the IL program is processed. If the subject statement is determined to be a member of the out instruction group (OUT, OUTM, OUT NOT, OUTM NOT, SET, SETM, RST, RSTM) of Table 2, then flow continues to State 2 and the next IL program statement is processed by the statement processor. However, if the subject statement is found to be a member of the fblk_1 instruction group, then a test is performed to determine if par_br is not set. If par_br is found to be not set, then flow proceeds to State 3 and the next statement is processed. Otherwise, if par_br is found to be set, then an "illegal branch error" is issued. If the subject statement is found to be a member of the load instruction group listed in Table 2, then the stack depth (stk_dp) is set to 1, a stack counter stk_cn[stk_dp] is set to FALSE and flow then continues to State 4 at which the next IL statement is processed.

If, however, the subject statement is determined to be a member of the ld_bl (load block) instruction group of Table 2, then par_br is set to TRUE, the stack depth (stk_dp) is set to 1 and the stack counter stk_cn[stk_dp] is set to TRUE and flow then continues to State 5 at which the next IL statement is processed. If the subject statement is found to be a member of the nop instruction group of Table 2, then process flow loops back to State 1 where the next statement in the IL program sequence is processed. However, if the subject statement is not found to be in any of the instruction groups in the State 2 state diagram above, then an "illegal transition error" is issued and the statement processor is terminated. The generation of the illegal transition error or other error indicates that the statement under test cannot be accurately represented as a relay ladder diagram.

Figure 5C:
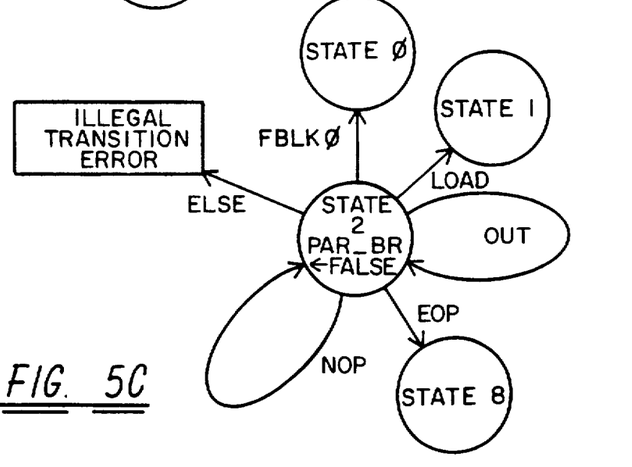
FIG. 5C is a state diagram of State 2 of the statement processor.

FIG. 5C is a state diagram of State 2 of the statement processor in controller 50. When State 2 is entered, flow proceeds to the center circle of the state diagram of FIG. 5C which is designated State 2 and at which par_br is set to FALSE. If the subject statement under test is a member of the fblk_0 instruction group, then flow proceeds back to State 0. If the subject statement is found to be a member of the load instruction group, then flow proceeds to State 1. However, if the subject statement is determined to be a member of the out instruction group or the nop instruction group, then flow continues back to State 2. If the subject statement is found to be a member of the eop instruction group, then flow goes to State 8 which is discussed later. If the subject statement is not found to be a member of any of the fblk_0, load, out, eop or nop instruction groups of Table 2, then flow continues along the ELSE line and an "illegal transition error" is issued signifying that conversion is not possible.

Figure 5D:
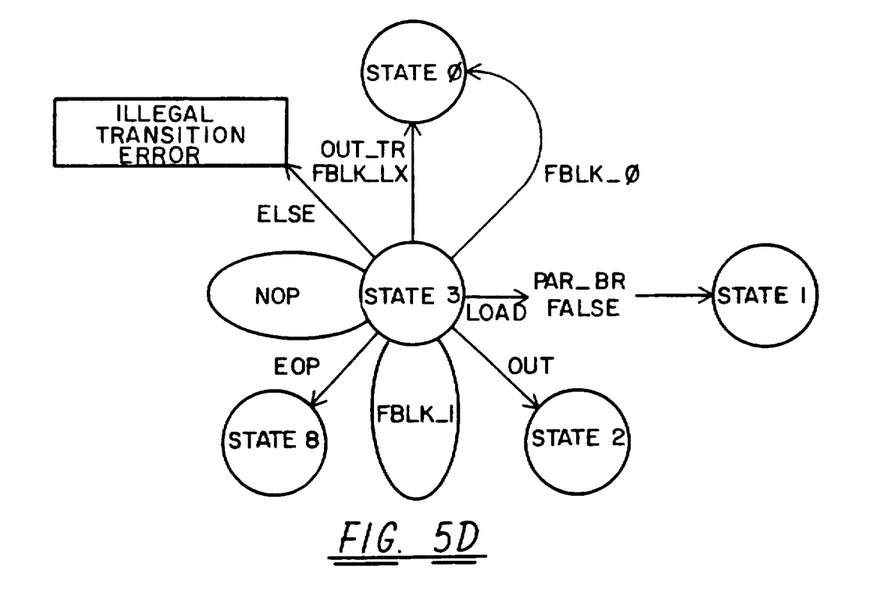
FIG. 5D is a state diagram of State 3 of the statement processor.

FIG. 5D is a state diagram of State 3 of the statement processor. The processing of the next statement in the IL program commences at the center of the state diagram of FIG. 5D which is designated State 3. If the subject statement is one of the instructions from instruction groups out_tr or fblk_1x of Table 2, then flow proceeds to State 0 at which the next IL program statement is processed. Similarly, if the subject statement is one of the group of instructions from the fblk_0 instruction group, the flow continues to State 0. If the subject statement is from the load instruction group, however, then par_br is set to FALSE and flow proceeds to State 1. If the subject statement or instruction is from the out instruction group, then flow continues to State 2. In contrast, if the subject statement is from the fblk_1 instruction group or the nop instruction group, then flow loops back to State 3. If the subject statement is determined to be a member of the eop instruction group then flow continues to State 8. However, if the subject statement is from none of the above instruction groups (out_tr, fblk_1x, fblk_0, load, out, fblk_1, eop or nop) then an illegal transition error is issued as seen in FIG. 5D thus signifying that conversion to a relay ladder diagram is not possible.

Figures 5E, 5G:
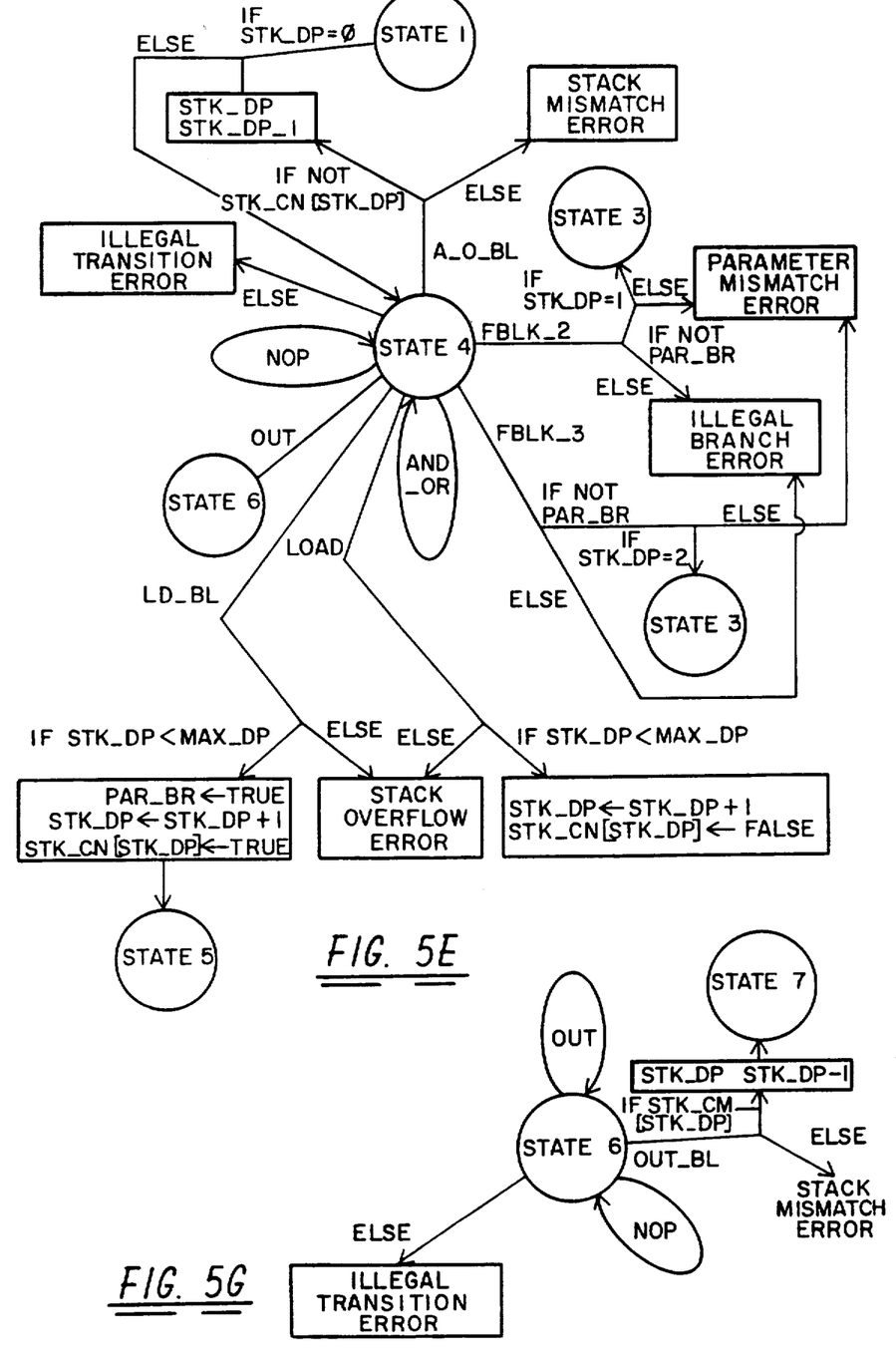
FIG. 5E is a state diagram of State 4 of the statement processor.
FIG. 5G is a state diagram of State 6 of the statement processor.

FIG. 5E is a state diagram of State 4 of the statement processor. The processing of the next statement in the IL program commences at the center of the state diagram of FIG. 5E which is designated State 4. If the next statement of the IL program (now the subject statement) is from the a_o_bl instruction group of Table 2, then a test is conducted to determine if stk_cn[stk_dp] is FALSE. If it is determined that stk_cn[stk_dp] is FALSE, then the stack depth stk_dp is decremented by 1. A further test is then conducted to determine if the stack depth stk_dp is now 0 after such decrementing. If it is determined that the stack depth stk_dp is now 0, then flow proceeds to State 1 at which the next IL statement is processed. Otherwise, if the stack depth is not 0, then flow continues to State 4 at which the next IL statement is processed. If in the step of determining if the stack counter stk_cn[stk_dp] is FALSE, it is determined that the stack counter stk_cn[stk_dp] is in fact TRUE, then a "stack mismatch error" is issued. Since a stack mismatch error has occurred, this particular IL program is invalid. It will be appreciated that the statement processor checks for a mismatch between the number of PUSHES and the number of POPS, and if such a violation is found where the number of PUSHES and POPS is not equal, then an appropriate stack mismatch error is issued. In this manner a check is provided to determine if a particular IL program is valid in addition to the check to determine if the IL program can otherwise be translated to a relay ladder diagram.

If in entering State 4 it is determined that the subject statement is within the fblk_2 instruction group, then a test is made to determine if par_br is set to FALSE. If par_br is set to FALSE then a further determination is made to find if the stack depth stk_dp equals 1. If the stack depth does equal 1, then flow proceeds to State 3. Otherwise, a parameter mismatch error is issued as shown in the state diagram of FIG. 5E. If in the earlier determination of whether par_br is set to FALSE, it is determined that par_br is set to TRUE, then an illegal branch error is issued as seen in FIG. 5E.

If, in entering State 4, it is determined that the subject statement is a member of the fblk_3 instruction group, then a test is made to determine if par_br is set to FALSE. If par_br is determined to be FALSE, then a further determination is made to find if the stack depth stk_dp equals 2. If the stack depth is found to equal 2, then flow proceeds to State 3. Otherwise, a "parameter mismatch error" is issued as shown in the state diagram of FIG. 5E. If however it was determined earlier that par_br is set to TRUE, then an "illegal branch error" is issued.

If, upon entering State 4, it is determined that the subject statement is a member of the and_or instruction group of Table 2, then loops back to State 4 as represented by the State 4 circle in the center of the state diagram of FIG. 5E.

If it is determined that upon entering State 4 the subject statement is a member of the load instruction group of Table 2, then a test is made to determine if the stack depth stk_dp is less than the maximum stack depth max_dp. If it is found that the stack depth stk_dp is indeed less than the maximum stack depth max_dp, then the stack depth stk_dp is incremented by 1, the stack counter stk_cn[stk_dp] is set to FALSE and flow continues back to State 4. Otherwise, if the stack depth stk_dp is not found to be less than the maximum stack depth max_dp, then a "stack overflow error" is issued. A stack depth violation is indicated in this manner.

If it is determined that upon entering State 4 the subject statement is a member of the ld_bl instruction group of Table 2, then a test is made to determine if the stack depth stk_dp is less than the maximum stack depth max_dp. If it is determined that the stack depth stk_dp is less than the maximum stack depth max_dp, then par_br is set to TRUE, the stack depth stk_dp is incremented by 1, the stack counter stk_cn[stk_dp] is set to TRUE and flow continues back to State 5. Otherwise, if the stack depth stk_dp is not found to be less than the maximum stack depth max_dp, then an "stack overflow error" is issued indicating that the particular IL program is invalid.

If, when State 4 is entered, it is determined that the subject statement is a member of the out instruction group, then flow continues to State 6. However, if when entering State 4 it is determined that the subject statement is a member of the nop instruction group, then flow loops back to State 4 and the next statement in the IL program sequence is processed. If upon entering State 4 it is determined that the subject statement is from none of the above instruction groups (a_or_bl, fblk_2, fblk_3, and_or, load, ld_bl, out, nop), then an illegal transition error is issued as seen in FIG. 5E signifying that the IL program is not convertible.

Figure 5F:
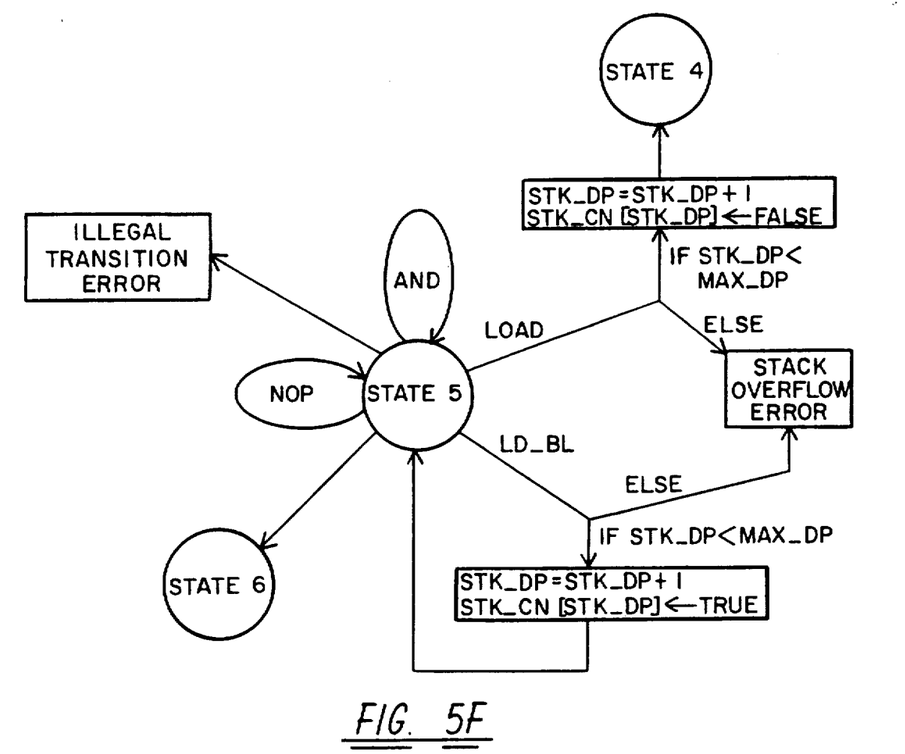
FIG. 5F is a state diagram of State 5 of the statement processor.

FIG. 5F is a state diagram of State 5 of the statement processor. Upon entering State 5, the entry point to which is signified by the circle designated State 5 at the center of the state diagram of FIG. 5, a test is made to determine if the subject statement is a member of the and instruction group. If the subject statement is found to be a member of the and instruction group, then flow loops back to State 5 and the next statement in the IL program is processed.

If upon entering State 5, it is determined that the subject statement is a member of the load instruction group, then a further test is made to determine if the stack depth stk_dp is less than the maximum stack depth max_dp. If so, then the stack depth stk_dp is incremented by 1, the stack counter stk_cn[stk_dp] is set to FALSE and flow proceeds to State 4 at which the next statement in the IL program is processed. If, however, it is determined that the stack depth stk_dp is not less than the maximum stack depth max_dp, then a "stack overflow error" is issued indicating that the subject IL program is invalid.

If upon entering State 5, it is determined that the subject statement is a member of the ld_bl instruction group, then a further test is made to determine if the stack depth stk_dp is less than the maximum stack depth max_dp. If so, the stack depth stk_dp is then incremented by 1, the stack counter stk_cn[stk_dp] is set to TRUE and flow proceeds back to State 5 at which the next statement in the IL program is processed. However, if it is determined that the stack depth stk_dp is not less than the maximum stack depth max_dp, then a "stack overflow error" is issued.

If it is found that upon entering State 5 that the subject statement is a member of the out instruction group, then flow proceeds to State 6 at which the next statement in the IL program is processed. If, however, it is found that when State 5 is entered that the subject statement is a member of the nop instruction group, then flow loops back to State 5 and the next statement or instruction in the IL program is processed. However, if upon entering State 5 it is determined that the subject statement is from none of the above instruction groups (and, load, ld_bl, out, nop), then an illegal transition error is issued as seen in FIG. 5F. The illegal transition error signifies that the IL program is not convertible to a relay ladder diagram.

FIG. 5G is a state diagram of State 6 of the statement processor. Upon entering State 6, the entry point to which is signified by the circle designated State 6 at the center of the state diagram of FIG. 5G, a test is made to determine if the subject statement is a member of the out instruction group. If the subject statement is found to be a member of the out instruction group, then flow loops back to State 6 and the next statement in the IL program is processed.

However, if upon entering State 6, it is determined that the subject statement is a member of the out_bl instruction group, then a further test is made to determine if the stack counter stk_cn[stk_dp] flag is set to true or false. A true flag indicates that the top item on the stack was put there by a Ld_bl and not by a load instruction. Since out_bl instructions are associated with Ld_bl instructions, a true flag results in decrementing of stk_dp by 1 and flow proceeds to State 7 at which the next statement in the IL program is processed. If, however, it is determined that the stack counter stk_cn[stk_dp] is false, then a stack mismatch error is generated.

If, upon entering State 6, it is determined that the subject statement is a member of the nop instruction group, then flow loops back to State 6 and the next statement in the IL program is processed. However, if upon entering State 6 it is determined that the subject statement is from none of the instruction groups mentioned above in the discussion of State 6, then an illegal transition error is generated indicating that the subject statement is not accurately translatable to a relay ladder diagram.

Figure 5H:
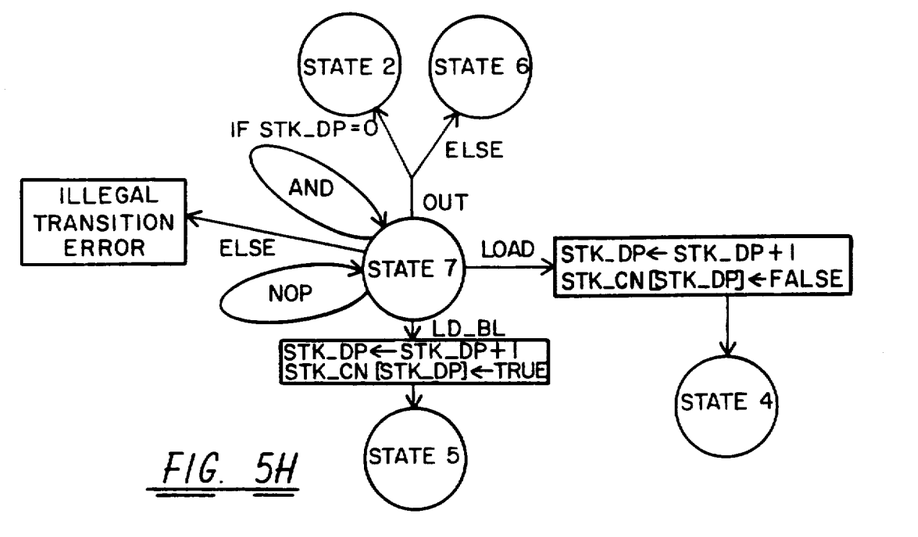
FIG. 5H is a state diagram of State 7 of the statement processor.

FIG. 5H is a state diagram of State 7 of the statement processor. If upon entry to State 7 it is found that the subject statement is a member of the and instruction group, then flow proceeds back to State 7. However, if it is found that the subject statement in the IL program is an out statement, then a further test is conducted to determine if the stack depth stk_dp is 0. If the stack depth stk_dp is found to be 0, then flow continues to State 2 and the next statement of the IL program is processed according to State 2. If the stack depth stk_dp is not found to be 0 when the subject statement is from the out instruction group, then flow continues to State 6 where the next IL instruction is processed.

If, upon entry to State 7, it is found that the subject statement is a member of the load instruction group, then stack depth stk_dp is incremented by 1, the stack counter stk_cn[stk_dp] is set to FALSE and flow proceeds to State 4 where the next IL program statement is processed. If however, upon entry to State 7 it is determined that the subject instruction is from the ld_bl instruction group, then stack depth stk_dp is incremented by 1, the stack counter stk_cn[stk_dp] is set to TRUE and flow proceeds to State 5 where the next IL program statement is processed.

Alternatively, if when State 7 is entered it is found that the subject instruction is from the nop instruction group, then flow loops back to State 7. However, if upon entering State 7 it is determined that the subject statement is from none of the instruction groups mentioned above in the discussion of State 7, then an illegal transition error is generated.

Figure 5I:
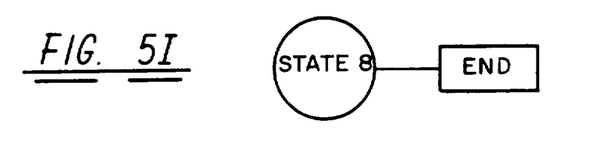
FIG. 5I is a state diagram of State 8 of the statement processor.

FIG. 5I is a state diagram of State 8 of the statement processor. Upon entry of State 8, processing of the IL program ends normally. If the statement processor reaches this normal end, this indicates that the tests in the statement processor have found no violations of the set of rules of Table 1 by the IL program under test. Thus the IL program is convertible to a relay ladder diagram and the subject IL program is valid. If, however, the statement processor terminates abnormally (that is, with one of the above described error messages), then the IL program under test is one which is either not convertible to a relay ladder diagram or is otherwise invalid.

To illustrate more fully the operation of the method of the present invention in programmable logic controller 50, a discussion is now undertaken of the action of the statement processor on an IL program which is capable of successfully being converted to a relay ladder diagram. For comparison purposes, the action of the statement processor on an IL program which is not convertible to a relay ladder diagram is also discussed later.

The IL program of FIG. 3A is an example of one IL program which may be converted to a relay ladder diagram. For purposes of the subsequent discussion, it is assumed that this IL program is loaded into programmable logic controller 50 and that the statement processor stored in RAM 56 performs the above described tests on the IL program to determine if the IL program abides by the set of rules of Table 1. To aid in this discussion, reference is made to the state diagrams of FIGS. 5A-5I.

While each statement is being sequentially processed by the statement processor, each statement is referred to as the subject statement for that period of time during which it is being tested by the statement processor program in controller 50. The first statement of the IL program of FIG. 3A is LD % I1 which is now considered to be the subject statement. The statement processor commences processing IL program statements in State 0 and thus reference is now made to the State 0 state diagram of FIG. 5A. At the entry point to State 0 (namely the central circle of the State 0 state diagram), a determination is made as to which instruction group the subject LD statement is a member. It is determined that the subject LD statement is from the load instruction group of Table 2 and thus flow continues to State 1 according to the state diagram of FIG. 5A.

The next statement is the IL program, namely the AND % I2 statement, becomes the subject statement which is then tested in State 1 as shown in the State 1 state diagram of FIG. 5B. In State 1, it is determined that the subject AND statement is from the and_or instruction group and thus flow loops back to State 1. The next statement in the IL program, namely the LD % I3 statement, becomes the subject statement which is still processed in State 1 of FIG. 5B. In State 1 it is determined that the subject LD % I3 statement is a member of the load instruction group and thus the stack depth stk_dp is set to 1, the stack counter stk_cn[stk_dp] is set to FALSE and flow continues to State 4 at which the next statement in the IL program is processed. It is noted that setting the stack counter stk_cn[stk_dp] to FALSE indicates that we are dealing with a LOAD instruction (LD) whereas if the stack counter stk_cn[stk_dp] is set to TRUE indicates that we are dealing with a LOAD BLK (LOAD BLOCK instruction. As previously described, a block signifies an operation on a previous subexpression so that an AND instruction differs from an AND_bl instruction.

Flow now continues in State 4, shown in FIG. 5E, where the next statement in the IL program, namely OR BLK, becomes the subject statement which is processed. In State 4 it is determined that the subject OR_BLK statement is a member of the a_o_bl (AND or OR block) instruction group and thus a further test is conducted to determine if stk_cn[stk_dp] is FALSE. From the discussion above, it is seen that in State 4 of FIG. 5E it will be determined that the stk_cn[stk_dp] stack counter was set to FALSE and thus the stack depth stk_dp (which was 1) is decremented by 1. Thus the stack depth stk_dp is now set to 0. Yet another test is then conducted to determine if the stack depth stk_dp is set to 0. Since the stack depth stk_dp is 0, flow continues back to State 1 according to the State 4 diagram of FIG. 5E.

Now that flow has proceeded back to State 1 of FIG. 5B the next statement of the IL program, namely OUT % Q1, becomes the subject statement which is processed. In State 1 it is found that the subject OUT % Q1 statement is a member of the out instruction group and thus flow proceeds to State 2 of FIG. 5C.

Once in State 2 the next statement in the IL program, <END OF PROGRAM>, is processed. In State 2 the <END OF PROGRAM> statement is found to be a member of the eop instruction group and therefore flow continues to State 8 of FIG. 5I at which the statement processor ends the processing of the IL program normally. Since processing has ended normally without an abnormal termination or error message, this signifies that this particular IL program is one which is convertible to the form of a relay ladder diagram and which is valid.

The IL program of FIG. 4A is an example of one IL program which is not accurately convertible to a relay ladder diagram. Processing of this IL program begins with the first statement thereof, namely LD % I1, which is now considered to be the subject statement. As before, processing of the IL program begins in State 0 shown in FIG. 5A. A determination is made that the subject statement is a member of the load instruction group and thus flow continues to State 1 of FIG. 5B at which the next statement, AND % I2, is processed as the subject statement.

At State 1, a determination is made that the subject statement is a member of the and_or instruction group and thus flow continues back to State 1. The next statement OUT % Q1 is now the subject statement which is processed in State 1. A determination is then made in State 1 that the subject statement is a member of the out instruction group and process flow goes to State 2 of FIG. 5C.

In State 2, the next statement of the IL program, namely OR % I3, becomes the subject statement which is processed. A determination is made in State 2 that the subject statement is not a member of any instruction group which State 2 recognizes (i.e., fblk_0, load, out, eop, nop) and thus an "illegal transition error" is generated. The issuance of this illegal transition error is an abnormal termination which signifies that this particular IL program is not accurately convertible to a relay ladder diagram or is otherwise not valid.

If a particular IL program is found to exhibit no violations of the set of rules of Table 1 which are embodied in the statement processor program in memory 56 of controller 50, then controller 50 goes ahead and converts the subject IL program to a relay ladder diagram which is displayed on display 60 of FIG. 2. The technology by which controller performs this conversion of IL programs to relay ladder diagram is already known. For example, the GE Fanuc Autmation N.A., Inc. model PLC 90-30 controller is one such product which converts an IL program to a relay ladder diagram and displays the diagram to the user. However, the present invention exhibits the advantage that if an error is indicated by the controller as it tests the individual statement of the IL program sequence, then no such conversion of the IL program to a relay ladder diagram occurs. The generation of inaccurate converted relay ladder diagrams is thus avoided.

The foregoing describes a method for checking the syntax of an IL program to assure that such program is convertible to a relay ladder diagram. The programmable logic controller checks each statement of the IL program against a set of rules which is stored in the controllers memory. If the controller finds any syntax violations which would cause inaccurate results upon conversion to a relay ladder diagram or conditions which would otherwise cause the IL program to be invalid, then an error is indicated to the user and the conversion from the IL program format to the relay ladder diagram does not occur. However, if no such errors are indicated by the controller as it test the statements of an IL program, then the controller proceeds to convert the IL program to a relay ladder diagram and to display that diagram.

While only certain preferred features of the invention have been shown by way of illustration, many modifications and changes will occur to those skilled in the art. It is, therefore, to be understood that the present claims are intended to cover all such modifications and changes which fall within the true spirit of the invention.

TABLE 2

INSTRUCTION GROUPS

```
fblk_0      ::   [NOOP ⊔ ENDSW ⊔ CEND]
fblk_1x     ::   [MCR ⊔ JUMP]
fblk_1      ::   [TMR ⊔ ADD ⊔ DPADD ⊔ SUB ⊔ DBSUB ⊔
MUL ⊔ DIV ⊔ MOD ⊔ EQ ⊔ NE ⊔ GT ⊔ GE
⊔ LT ⊔ LE ⊔ AND ⊔ OR ⊔ NOT ⊔ MOVEI ⊔
MOVIN ⊔ BMOVI ⊔ MOVEW ⊔ MOVWN ⊔
BMOVW ⊔ BLKCL ⊔ COMRQ ⊔ INT ⊔ BCD ⊔
DOI/O ⊔ ROL ⊔ ROR ⊔ DPMUL ⊔ DPDIV ⊔
DPMOD ⊔ DPEQ ⊔ DPNE ⊔ DPGT ⊔ DPGE ⊔
DPLT ⊔ DPLE ⊔ SYSRQ]
fblk_2      ::   [ONDTR ⊔ UPCTR ⊔ DNCTR ⊔ SHL ⊔ SHR
⊔ SHFRI ⊔ SHFRW]
fblk_3      ::   [SEQB]
load        ::   [LD ⊔ LD NOT]
and         ::   [AND ⊔ AND NOT]
```

```
and_or       ::    [AND |  AND NOT | OR |  OR NOT]
out          ::    [OUT |  OUTM |  OUT NOT |  OUTM NOT |
SET |  SETM |  RST | RSTM]
out_tr       ::    [OUT+ |  OUT-]
ld_bl        ::    [LD BLK]
out-bl       ::    [OUT BLK]
a_o_bl       ::    [AND BLK |  OR BLK]
nop          ::    [NOP]
eop          ::    [<END OF PROGRAM>]
```

The NEEDED VARIABLES used in the statement processor are presented below in Table 3.

PPENDIX 1 - Statement Processor Program

```
TRUCTION GROUPS
   _0        ::    { NOOP | ENDSW | CEND }
   _1x       ::    { MCR | JUMP }
   _1        ::    { TMR | ADD | DPADD | SUB | DPSUB | MUL | DIV | MOD | EQ | NE | GT | GE |
                     LT | LE | AND | OR | NOT | MOVEI | MOVIN | BMOVI | MOVEW | MOVWN |
                     BMOVW | BLKCL | COMRQ | INT | BCD | DOI/O | ROL | ROR | DPMUL | DPDIV |
                     DPMOD | DPEQ | DPNE | DPGT | DPGE | DPLT | DPLE | SYSRQ }
   _2        ::    { ONDTR | UPCTR | DNCTR | SHL | SHR | SHFRI | SHFRW }
   _3        ::    { SEQB }
             ::    { LD | LD NOT }
             ::    { AND | AND NOT }
   .or       ::    { AND | AND NOT | OR | OR NOT }
             ::    { OUT | OUTM | OUT NOT | OUTM NOT | SET | SETM | RST | RSTM }
   tr        ::    { OUT+ | OUT- }
   l         ::    { LD BLK }
   bl        ::    { OUT BLK }
   .bl       ::    { AND BLK | OR BLK }
             ::    { NOP }
             ::    { <END OF PROGRAM> }
:DED VARIABLES
             ::    { 0 .. 8 } VALUE 0   /* 9 state validity check */
   _dp       ::    { 7 /* 30.35 */ }
   tp        ::    { 1 .. max_dp }      /* Monitor depth of stack */
   br        ::    { FALSE | TRUE }     /* Multi-branch sequence? */
   m         ::    ARRAY [stk_dp] OF { TRUE | FALSE }   /* Stack element from LD BLK? */
``` that in the state diagram below, the comment "/* SoS */" indicates a transition which terminates the previous ence and begins a new one.

```
STATE 0: /* Start of Sequence */
    par_br <- FALSE
    CASE OF
        CASE    fblk_0:  state <- 0        /* SoS */
        CASE    load:    state <- 1        /* SoS */
        CASE    eop:     state <- 8        /* SoS */
        CASE    nop:     state <- 0
        CASE    ELSE     /* sequence start error */
    END CASE
```

APPENDIX 1

```
STATE 1:  /* Accumulator only; empty stack */
    CASE OF
        CASE   out_tr,
               fblk_1x:  IF NOT par_br THEN
                             state ← 0
                         ELSE
                             /* illegal branch error */
                         ENDIF
        CASE   and_or:   state ← 1
        CASE   out:      state ← 2
        CASE   fblk_1:   IF NOT par_br THEN
                             state ← 3
                         ELSE
                             /* illegal branch error */
                         ENDIF
        CASE   load:     stk_dp ← 1
                         stk_cn [stk_dp] ← FALSE
                         state ← 4
        CASE   ld_bl:    par_br ← TRUE
                         stk_dp ← 1
                         stk_cn [stk_dp] ← TRUE
                         state ← 5
        CASE   nop:      state ← 1
        CASE   ELSE      /* illegal transition error */
    END CASE STATE 2:  /* Final output sub-sequence */
    par_br ← FALSE
    CASE OF
        CASE   fblk_0:   state ← 0        /* SoS */
        CASE   load:     state ← 1        /* SoS */
        CASE   out:      state ← 2
        CASE   eop:      state ← 8        /* SoS */
        CASE   nop:      state ← 2
        CASE   ELSE      /* illegal transition error */
    END CASE
```

APPENDIX 1

```
STATE 3:  /* Function blocks with boolean out */
    CASE OF
        CASE   out_tr,
               fblk_1x:  state ← 0
        CASE   fblk_0:   state ← 0        /* SoS */
        CASE   load:     par_br ← FALSE   /* SoS */
                         state ← 1
        CASE   out:      state ← 2
        CASE   fblk_1:   state ← 3
        CASE   eop:      state ← 8        /* SoS */
        CASE   nop:      state ← 3
        CASE   ELSE      /* illegal transition error */
    END CASE
```

'PENDIX 1
```
STATE 4: /* Stack Processing */
    CASE OF
        CASE    a_o_bl:     IF NOT stk_cn [stk_dp] THEN
                                stk_dp ← stk_dp - 1
                                IF stk_dp = 0 THEN
                                    state ← 1
                                ELSE
                                    state ← 4
                                ENDIF
                            ELSE
                                /* stack mismatch error */
                            ENDIF
        CASE    fblk_2:     IF NOT par_br THEN
                                IF stk_dp = 1 THEN
                                    state ← 3
                                ELSE
                                    /* parameter mismatch error */
                                ENDIF
                            ELSE
                                /* illegal branch error */
                            ENDIF
        CASE    fblk_3:     IF NOT par_br THEN
                                IF stk_dp = 2 THEN
                                    state ← 3
                                ELSE
                                    /* parameter mismatch error */
                                ENDIF
                            ELSE
                                /* illegal branch error */
                            ENDIF
        CASE    and_or:     state ← 4
        CASE    load:       IF stk_dp < max_dp THEN
                                stk_dp ← stk_dp + 1
                                stk_cn [stk_dp] ← FALSE
                                state ← 4
                            ELSE
                                /* stack overflow error */
                            ENDIF
        CASE    ld_bl:      IF stk_dp < max_dp THEN
                                par_br ← TRUE
                                stk_dp ← stk_dp + 1
                                stk_cn [stk_dp] ← TRUE
                                state ← 5
                            ELSE
                                /* stack overflow error */
                            ENDIF
        CASE    out:        state ← 6
        CASE    nop:        state ← 4
        CASE    ELSE        /* illegal transition error */
    END CASE
```

APPENDIX 1

```
STATE 7: /* OUT BLK validation */
    CASE OF
        CASE   and:    state ← 7
        CASE   out:    IF stk_dp = 0 THEN
                          state ← 2
                       ELSE
                          state ← 6
                       ENDIF
        CASE   load:   stk_dp ← stk_dp + 1
                       stk_cn [stk_dp] ← FALSE
                       state ← 4
        CASE   ld_bl:  stk_dp ← stk_dp + 1
                       stk_cn [stk_dp] ← TRUE
                       state ← 5
        CASE   nop:    state ← 7
        CASE   ELSE    /* illegal transition error */
    END CASE

STATE 8: /* END */
```

What is claimed is:

1. A method for determining if an instruction list (IL) program is representable as a relay ladder diagram, said program being provided to a programmable logic controller including a memory for storing the program, said method comprising the steps of:

providing the controller with a predetermined set of rules of which a violation by a statement or the order of the statement in the program indicates that the program is not accurately representable as a relay ladder diagram;

processing in the controller each statement of the program to determine if any of the statements or the order of the statements violate a rule in the set of rules; and generating in the controller an error indication if any statement or order thereof of the program violates one of the set of rules.

2. The method of claim 1 including the step of terminating in the controller said step of processing, said terminating step being invoked when a statement of the IL program is found to violate one of the set of rules.

3. The method of claim 1 wherein the memory includes a stack and wherein said processing step includes the controller checking to determine if the IL program requires a stack depth greater than a preselected maximum stack depth and for generating an error code if the maximum stack depth is exceeded.

4. The method of claim 1 wherein the memory includes a stack and the IL program includes pushes and pops, said processing step including the controller checking to determine if the IL program causes a stack mismatch error in which the number of pushes and the number of pops in the IL program are not equal, and generating an error signal upon detection of unequal numbers of pushes and pops.

5. A method for determining if an instruction list (IL) program is representable as a relay ladder diagram, the program being provided to a programmable logic controller including a memory for storing the program, the controller being coupled to a display for displaying relay ladder diagrams, said method comprising the steps of:

providing said controller with a predetermined set of rules of which a violation by a statement or order of statements in the program indicates that the program is not accurately representable as a relay ladder diagram;

processing in the controller each statement of the program in the order listed to determine if any of the statements or order thereof violate a rule in the set of rules;

generating in the controller an error indication if any statement or order thereof of the program violates one of the set of rules;

converting in the controller the IL program to a relay ladder diagram; and displaying on said display the relay ladder diagram generated in said converting step.

6. The method of claim 5 including the step of terminating in the controller said step of processing, said terminating step being invoked when a statement or order thereof of the IL program is found to violate the set of rules.

7. The method of claim 5 wherein the memory includes a stack and wherein said processing step includes the controller checking to determine if the IL program requires a stack depth greater than a preselected maximum stack depth and generating an error signal in response thereto.

8. The method of claim 5 wherein the memory includes a stack and the IL program includes pushes and pops, said processing step including checking to determine if the IL program causes a stack mismatch error in which the number of pushes and the number of pops in the IL program are not equal, and generating an error signal when the pushes and pops are not equal.

* * * * *